(12) United States Patent
Bureau et al.

(10) Patent No.: US 7,143,604 B2
(45) Date of Patent: Dec. 5, 2006

(54) COOLANT EVAPORATOR

(75) Inventors: Cathy Bureau, Stuttgart (DE); Stefan Morgenstern, Stuttgart (DE)

(73) Assignee: Behr GmbH & Co. KG, Stuttgart (DE)

(*) Notice: Subject to any disclaimer, the term of this patent is extended or adjusted under 35 U.S.C. 154(b) by 105 days.

(21) Appl. No.: 10/507,694

(22) PCT Filed: Sep. 1, 2003

(86) PCT No.: PCT/EP03/09673

§ 371 (c)(1),
(2), (4) Date: Sep. 23, 2004

(87) PCT Pub. No.: WO2004/036133

PCT Pub. Date: Apr. 29, 2004

(65) Prior Publication Data

US 2005/0166632 A1  Aug. 4, 2005

(30) Foreign Application Priority Data

Oct. 10, 2002  (DE) .............................. 102 47 268

(51) Int. Cl.
*F25B 39/02* (2006.01)

(52) U.S. Cl. .......................................... 62/515; 62/430

(58) Field of Classification Search ................ 62/515, 62/506, 513, 430; 165/140
See application file for complete search history.

(56) References Cited

U.S. PATENT DOCUMENTS

| | | | |
|---|---|---|---|
| 4,403,645 A * | 9/1983 | MacCracken | ................ 165/10 |
| 6,343,485 B1 | 2/2002 | Duerr et al. | |
| 2002/0088246 A1 | 7/2002 | Bureau et al. | |
| 2002/0088248 A1 | 7/2002 | Bureau et al. | |
| 2003/0131623 A1 * | 7/2003 | Suppes | ..................... 62/324.1 |

FOREIGN PATENT DOCUMENTS

| | | |
|---|---|---|
| DE | 198 57 121 A1 | 6/2000 |
| DE | 199 48 943 A1 | 4/2001 |
| DE | 101 56 944 A1 | 7/2002 |
| DE | 101 56 882 A1 | 8/2002 |
| EP | 0 995 621 A2 | 4/2000 |

\* cited by examiner

*Primary Examiner*—Melvin Jones
(74) *Attorney, Agent, or Firm*—Foley & Lardner LLP

(57) ABSTRACT

A coolant evaporator (1) has a heat transmission surface (3) provided for the transmission of heat from air to a coolant and a number of flow duct segments (2) provided for receiving the coolant. A storage capsule (6a, 6b) provided for filling with a heat storage medium is arranged between adjacent flow duct segments (2). The coolant evaporator (1) is especially suitable for a motor vehicle with an idle-stop function.

13 Claims, 1 Drawing Sheet

COOLANT EVAPORATOR

Figure 1:
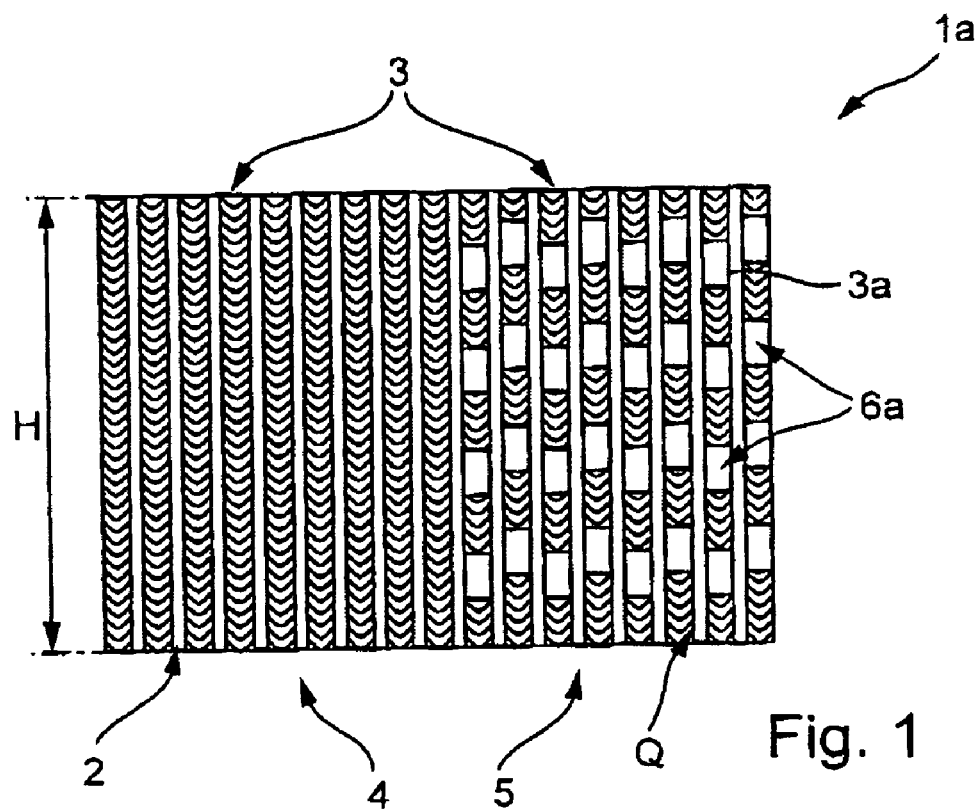

The invention relates to a coolant evaporator with, a heat transmission surface, provided for the transmission of heat from air to an evaporating coolant, in particular a number of heat transmission surfaces designed as ribs, and with a number of flow duct segments which are arranged essentially parallel to one another and are provided for receiving the evaporating coolant and which are designed, in particular, as tubes.

Coolant evaporators having the features mentioned initially are used, for example, in air-conditioning installations of motor vehicles. The air-conditioning installation of a motor vehicle normally operates with a compressor driven by the vehicle engine via a belt. For the sake of a reduction in consumption, there are vehicles in use in which the engine is switched off automatically when the vehicle is at a standstill, for example at traffic lights. This measure is also designated as idle stop. With the engine being switched off, the air-conditioning installation is therefore also rendered inoperative. In order nevertheless to make it possible to have a temporary cooling function even when the engine is at a standstill, for example, EP 0 995 621 A2 proposes to freeze condensation water in a controlled manner by means of a coolant evaporator of a vehicle air-conditioning installation, in order thereby to generate an ice store which can be utilized as a cold store even when the compressor of the air-conditioning installation is at a standstill. However, the formation of condensation water and consequently the possibility of the controlled icing-up of the coolant evaporator depends greatly on the climatic conditions. There is, furthermore, the risk that, due to pronounced icing-up, the airflow necessary for heat transmission is considerably restricted or virtually prevented.

The object on which the invention is based is to specify a coolant evaporator, in particular for an air-conditioning installation of a motor vehicle, which allows cold storage in a simple and reliable way.

The coolant evaporator has a heat transmission surface, preferably a plurality of heat transmission surfaces designed as ribs, for the transmission of heat from air to a coolant. The evaporating coolant flows, in the coolant evaporator, in a number of flow duct segments arranged essentially parallel to one another and preferably designed as coolant tubes. In the evaporator, at least parts of the flow duct segments may, in addition to ribs present where appropriate, form heat transmission surfaces for the transmission of energy from air to the coolant. Between adjacent flow duct segments is arranged a storage capsule which is filled with a heat storage medium, preferably what is known as a latent medium, and which extends over part of the height of the flow duct segments adjacent to the storage capsule.

According to a preferred refinement, a plurality of, preferably at least four storage capsules are arranged between two adjacent flow duct segments. A single storage capsule preferably extends over no more than 25%, in particular no more than 15%, of the height of the flow duct segments. As a result, the consequently relatively small storage capsules have a large overall surface in relation to their volume. It thus becomes possible to have highly effective heat transmission both between the storage capsules and the coolant flowing in the flow duct segments and between the storage capsules and the air flowing through the evaporator.

Preferably, overall, a larger number, for example 10 to 100, in particular 30 to 60, of storage capsules are arranged in a plurality of interspaces formed between individual flow duct segments. The storage capsules are in this case preferably grouped only in part of the coolant evaporator, while a remaining part of the coolant evaporator is free of storage capsules and does not differ in its functioning from conventional coolant evaporators. By contrast, the second coolant evaporator part carrying the storage capsules acts as what is known as a storage evaporator.

The coolant evaporator can preferably be operated in various operating modes, and the air supply to the individual parts of the coolant evaporator, with or without storage capsules, can be regulated separately.

In a first operating mode, in normal driving operation, with an average cold requirement, the air supply to a first part of the coolant evaporator without storage capsules is opened, while the air supply to a second part of the coolant evaporator, in which the storage capsules are arranged, is throttled or shut off. The heat storage medium contained in the storage capsules, in the second part of the evaporator, is thereby cooled, while the second part of the evaporator receives heat from the surrounding air at most to an insignificant extent.

When the compressor is at a standstill, in a second operating mode of the air-conditioning installation, the air supply to this second part of the coolant evaporator is opened, while the air supply to the first coolant evaporator part having no storage capsules is closed. The cooling of the air flowing between the flow duct segments is thus maintained temporarily, for example up to a few hundred seconds.

If, in a third operating mode of the air-conditioning installation, a very high cold capacity is provisionally required, the air supply to the entire coolant evaporator is opened. Thus, in this operating mode, the entire evaporator surface can be utilized for air cooling.

In a way which is particularly beneficial in manufacturing terms, the storage capsule or storage capsules is or are held preferably by at least two surface segments of the heat transmission surface. In this case, surface segments of the heat transmission surface are formed, in particular, from the surfaces of the flow duct segments designed, for example, as tubes and from ribs which are coupled thermally to the flow duct segments and which preferably extend in each case between adjacent flow duct segments. The width of the storage capsule in this case preferably corresponds approximately to the distance between two adjacent flow duct segments. It is thereby possible to assimilate the construction of the coolant evaporator essentially to that of a conventional coolant evaporator without storage capsules. The storage capsules are preferably clamped between adjacent flow duct segments and/or adjacent ribs of the coolant evaporator without additional fastening means. A good thermal coupling of the storage capsules to the flow duct segments carrying the coolant is also achieved in this way.

The airflow between the flow duct segments preferably designed as tubes should not be restricted too greatly by the storage capsules. This is ensured preferably in that the flow cross section, formed between adjacent flow duct segments, for the air flowing through the evaporator is covered at most by half by one or more storage capsules. This relates both to a single, in particular gap-shaped interspace, forming a flow cross section for the air, between adjacent flow duct segments and to that part of the end face of the evaporator in which storage capsules are arranged, that is to say the second part of the evaporator, in so far as this is subdivided into a part without and a part with storage capsules.

The heat storage medium enclosed in the storage capsules preferably has a phase transition temperature, in particular a freezing point or a dew point, which is higher than the evaporation temperature of the coolant in the coolant evaporator. The storage capsules can consequently be utilized as latent stores; the heat storage medium is correspondingly also designated as a latent medium.

If the coolant evaporator has a plurality of storage capsules, according to a preferred development, at least some of these capsules, for example all the capsules arranged between two adjacent coolant tubes, are connected to one another fluidically with respect to the heat storage medium with which the storage capsules are filled, and can thus be filled jointly in a simple way.

The advantage of the invention is, in particular, that, by storage capsules filled with a heat storage medium being inserted between adjacent flow duct segments of a coolant evaporator, a cold store is integrated into the latter in a particularly simple way in manufacturing terms.

Figure 2:
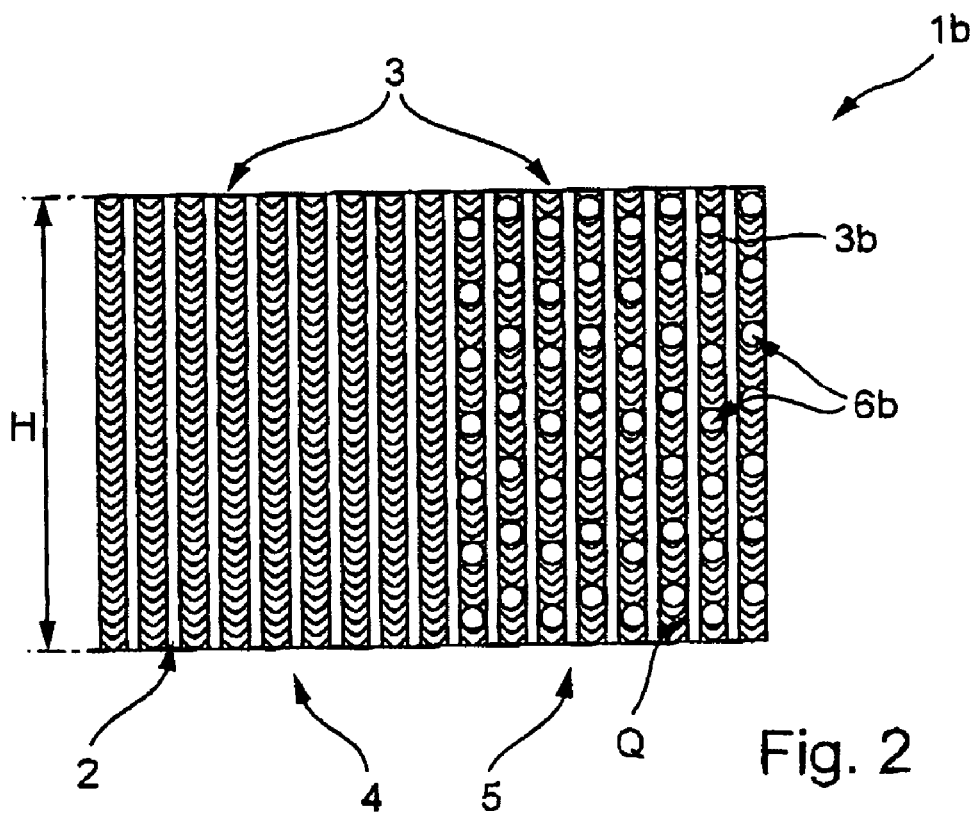

An exemplary embodiment of the invention is explained in more detail below with reference to a drawing in which:

FIG. 1 shows a first exemplary embodiment of a coolant evaporator with storage capsules, and FIG. 2 shows a second exemplary embodiment of a coolant evaporator with storage capsules.

Parts corresponding to one another are given the same reference symbols in both figures.

FIGS. 1 and 2 show in each case a diagrammatic front view of a coolant evaporator a, 1b of a vehicle air-conditioning installation, not illustrated in any more detail. Each coolant evaporator 1a, 1b has a number of coolant tubes 2 oriented parallel to one another and also designated as flow duct segments. A multiplicity of heat transmission surfaces designed as ribs 3 are arranged in each case between adjacent coolant tubes 2. The ribs 3 serve for the transmission of heat energy from air flowing between the coolant tubes 2 to the coolant, in particular R 134a, evaporating in the coolant tubes. In addition to the ribs 3, heat is also exchanged, directly on the surfaces of the coolant tubes 2, between the coolant and the air flowing through the coolant evaporator 1a, 1b. That part of the illustrated end face of the coolant evaporator 1a, 1b which is formed between the individual coolant tubes 2 and ribs 3 is designated as the flow cross section Q. Since the distance between adjacent coolant tubes 2 in the exemplary embodiments illustrated corresponds approximately to the diameter of the coolant tubes 2, the flow cross section Q amounts approximately to half the end face of the coolant evaporator 1a, 1b.

Each coolant evaporator 1a, 1b is composed of a first part 4, on the left in the illustrations, which is designed as an evaporator part and of a second part 5, which is designed as an evaporator and storage part. A number of storage capsules 6a, 6b are arranged in each case in the storage and evaporator part 5. The storage capsules 6a provided in the exemplary embodiment according to FIG. 1 have a rectangular cross section, while the storage capsules 6b of the exemplary embodiment according to FIG. 2 have a circular cross section. In general, the storage capsules may have the most diverse possible type of construction, for example cylindrical, square, conical, barrel-shaped or pyramidal. In both exemplary embodiments, the second part 5 occupies barely half the end face of the coolant evaporator 1a, 1b.

In the exemplary embodiment according to FIG. 1, four storage capsules 6a are arranged, in particular clamped, in each case between two adjacent flow duct segments 2, each of the storage capsules 6a extending over approximately 10% of the height H of the coolant evaporator 1a. In contrast to this, in the exemplary embodiment according to FIG. 2, seven storage capsules 6b are clamped in each case between two adjacent flow duct segments 2, each of the storage capsules 6b extending only over approximately 5% of the height H of the coolant evaporator 1a. In order to allow particularly good heat transition between the heat storage medium contained in the storage capsules 6a, 6b and the coolant flowing in the flow duct segments 2 and to achieve a mechanically especially stable connection, a materially integral connection, for example a soldered joint, may also be provided between the storage capsules 6a, 6b and the heat transmission surfaces 3 contiguous to these.

Particularly in the case of a small dimensioning of the storage capsules, as in the storage capsules 6b illustrated in FIG. 2, these may be pressed in between the ribs during assembly, presupposing a sufficient flexibility of the latter. If the storage capsules have larger dimensioning, as in the storage capsules 6a illustrated in FIG. 1, these may be pushed between adjacent coolant tubes 2 when the ribs 3 are cut open or removed in the region provided for receiving the storage capsules 6a. In each of the exemplary embodiments, the storage capsules 6a, 6b are clamped in each case between two adjacent coolant tubes 2 and two adjacent ribs 3. The contact surfaces of the coolant tubes 2 or ribs 3 with the storage capsules 6a, 6b, said contact surfaces serving for fixing the storage capsules 6a, 6b and for heat transmission between the coolant and the storage capsules 6a, 6b, are designated as surface segments 3a, 3b.

The coolant evaporator 1a, 1b having the storage capsules 6a, 6b largely corresponds in its basic construction to a conventional evaporator of a vehicle air-conditioning system without cold storage elements. Modifications, necessary if appropriate, to the components which carry coolant and transmit heat can be carried out in a simple way during or after the manufacture of the evaporator. In the exemplary embodiments, apart from the air routing, not illustrated, to the coolant evaporator 1a, 1b, these modifications relate solely to the heat transmission surfaces 3. The coolant evaporator 1a, 1b is suitable especially for a vehicle with an idle-stop system and may be used with a similar basic construction in a vehicle type both with and without an idle-stop function. In this case, in equipment variants without an idle-stop function, storage capsules are dispensed with, since, in this case, the running compressor of the air-conditioning installation provides an uninterrupted cold supply.

A plurality of or all the storage capsules 6a, 6b are preferably connected fluidically to one another, for example by means of a line, not illustrated, so that the connected storage capsules 6a, 6b can be filled jointly with a heat storage medium. The heat storage medium has a freezing point which lies above the evaporation temperature of the coolant flowing in the coolant tubes 2, so that, when the coolant evaporator 1a, 1b is in operation, the heat storage medium in the storage capsules 6a, 6b freezes. In order to ensure rapid freezing, the storage capsules 6a, 6b are coupled to the coolant tubes 2 in a highly heat-conductive manner.

When the vehicle is in normal driving operation with a moderate cooling requirement, a free airflow to that part 4 of the coolant evaporator 1a, 1b which is free of storage capsules is made possible, for example, by means of flaps, not illustrated, while the air supply to that part 5 of the coolant evaporator 1a, 1b which is provided with storage capsules 6a, 6b is throttled or prevented. The first part 4 of the coolant evaporator 1a, 1b consequently serves for cooling the air flowing into the vehicle interior, while the storage capsules 6a, 6b are "charged", that is to say cooled, in the second part 5.

When the storage capsules 6a, 6b are cooled, the air supply to the second part 5 may additionally be opened in the case of a very high cooling air requirement. Otherwise, with an average cooling requirement, an air supply to the second part 5 is required only when the vehicle engine and the coolant compressor are at a standstill. In this case, the air supply to the first part 4 is closed, while the air flowing through the second part 5 is cooled with the aid of the storage capsules 6a, 6b. The heat transfer medium enclosed in the storage capsules 6a, 6b and also designated as a latent medium melts in this case and thus maintains the cooling of the air.

The multiplicity of individual storage capsules 6a, 6b in a second part 5 of the coolant evaporator 1a, 1b has the advantage that, since this provides a large overall surface of the storage capsules 6a, 6b and the good thermal coupling of these to the coolant tubes 2 and ribs 3, highly effective heat transmission to the air flowing through the coolant evaporator 1a, 1b is ensured. At the same time, the airstream through the second part 5 is not restricted too greatly by the storage capsules 6a, 6b. The storage capsules 6a, 6b cover the flow cross section Q, with respect solely to the second part 5 of the coolant evaporator 1a, 1b, approximately by half in the exemplary embodiment according to FIG. 1 and only approximately by a quarter in the exemplary embodiment according to FIG. 2.

The invention claimed is:

1. A coolant evaporator, comprising:
 a coolant evaporator that forms a heat transmission surface, wherein the heat transmission surface is adapted to transmit heat from air to a coolant,
 a plurality of flow duct segments of a height which are arranged essentially parallel to one another and are adapted to receive the coolant, and
 at least one storage capsule which is arranged between two adjacent flow duct segments and is adapted to be filled with a heat storage medium, wherein the storage capsule extends over part of the height of the flow duct segments,
 wherein the at least one storage capsule contains heat storage medium with a phase transition temperature that is higher than the evaporation temperature of the coolant in the flow duct segments.

2. The coolant evaporator as claimed in claim 1, wherein the storage capsule is held by at least two surface segments of the heat transmission surface.

3. The coolant evaporator as claimed in claim 1, wherein the two surface segments of the heat transmission surface are located opposite one another and are formed in each case by a flow duct segment.

4. The coolant evaporator as claimed in claim 1, wherein each storage capsule extends over at most 25% of the height of the flow duct segments adjacent to the storage capsule.

5. The coolant evaporator as claimed in claim 1, wherein a flow cross section, formed between adjacent flow duct segments for air transmitting heat to the coolant is covered at most by half by one or more storage capsules.

6. The coolant evaporator as claimed in claim 1, further comprising a coolant evaporator part with at least one storage capsule,
 wherein the supply of air to the coolant evaporator part can be shut off.

7. The coolant evaporator as claimed in claim 1, further comprising a plurality of storage capsules fluidly connected to one another with respect to the heat storage medium contained in the storage capsules.

8. The coolant evaporator as claimed in claim 1, further comprising a coolant evaporator part without a storage capsule,
 wherein the supply of air to the coolant evaporator part can be shut off.

9. The coolant evaporator as claimed in claim 1, further comprising a first coolant evaporator part with at least one storage capsule and a second coolant evaporator part without a storage capsule,
 wherein the supply of air to the first and second coolant evaporator parts can be alternately shut off so that air can be supplied to a first or second coolant evaporator part and shut off from the other of the first or second coolant evaporator part.

10. The coolant evaporator as claimed in claim 9, wherein the supply of air can be supplied to both the first and second coolant evaporator parts.

11. The coolant evaporator as claimed in claim 1, wherein the heat transmission surface includes ribs.

12. A heat exchange system comprising a coolant evaporator according to claim 1.

13. A motor vehicle comprising a coolant evaporator according to claim 1.

* * * * *